United States Patent [19]

Gardner et al.

[11] Patent Number: 4,834,933

[45] Date of Patent: May 30, 1989

[54] METHOD OF MOLDING FIBER REINFORCED ARTICLES

[75] Inventors: Hugh C. Gardner; Linda A. Domeier, both of Somerville, N.J.

[73] Assignee: Union Carbide Corporation, Danbury, Conn.

[21] Appl. No.: 771,582

[22] Filed: Sep. 3, 1985

Related U.S. Application Data

[60] Division of Ser. No. 657,054, Oct. 3, 1984, abandoned, which is a continuation of Ser. No. 545,604, Oct. 27, 1983, abandoned, which is a continuation of Ser. No. 279,446, Jun. 1, 1981, abandoned.

[51] Int. Cl.$^4$ .............................................. B29C 45/14
[52] U.S. Cl. ................... 264/257; 264/328.2; 264/328.4; 264/331.13; 264/331.14; 264/331.15; 264/331.18; 524/779; 524/789; 524/847; 524/855; 524/853; 525/181; 525/184; 525/426
[58] Field of Search ............... 425/543, 547, 557; 264/257, 328.6, 328.2, 328.14, 331.13, 331.15, 331.18; 524/779, 780, 781, 783, 784, 785, 786, 789, 847, 855, 853; 525/183, 184, 426

[56] References Cited

U.S. PATENT DOCUMENTS

| | | | |
|---|---|---|---|
| 3,748,075 | 7/1973 | Taylor | 425/289 X |
| 3,819,312 | 6/1974 | Arpajian | 425/543 |
| 3,899,277 | 8/1975 | Winter | 425/126 R X |
| 4,113,686 | 9/1978 | Holcombe, Jr. | 264/2.6 |
| 4,149,838 | 4/1979 | Sutch | 425/126 R |
| 4,624,814 | 11/1986 | McDougal | 264/320 |
| 4,647,418 | 3/1987 | McDougal | 264/320 |
| 4,673,539 | 6/1987 | Hommar | 264/320 |
| 4,692,291 | 9/1987 | Angell | 264/102 |

OTHER PUBLICATIONS

Witco Chemical, U.S. Peroxygen Division, Product Briefing, May, 1976.

Primary Examiner—Jan H. Silbaugh
Assistant Examiner—Jeremiah F. Durkin, II
Attorney, Agent, or Firm—Paul W. Leuzzi

[57] ABSTRACT

A method of molding fiber-reinforced thermoset resin articles having improved mechanical properties. A thermosettable organic material is injected into a mold containing a fiber web. The molding composition includes (a) a thermosettable organic material containing two or more polymerizable carbon-carbon double bonds, (b) an ethylenically unsaturated monomer which forms a liquid homogeneous mixture with and is copolymerizable with (a) and is different from (a), and (c) an effective amount of an initiator or a mixture of initiators characterized by a ten-hour half life temperature, or in the case of a mixture of initiators, and average ten-hour half life temperature, of greater than about 50° C. and less than 105° C., which produces on decomposition less than 1.0 milliliter of gas per gram of resin as measured at a temperature of 25° C. and a pressure of one atmosphere.

1 Claim, No Drawings

METHOD OF MOLDING FIBER REINFORCED ARTICLES

This application is a division of application Ser. No. 657,054, filed Oct. 3, 1984, now abandoned, which is a continuation of application Ser. No. 545,604, filed Oct. 27, 1983, now abandoned, which is a continuation of application Ser. No. 279,446, filed July 1, 1981, now abandoned.

This invention is directed to curable molding compositions which are used for producing fiber reinforced articles, such as automotive parts or appliance housings on fast mold cycles.

A novel process for producing fiber reinforced articles is described in commonly owned U.S. patent application Ser. No. 135,906 entitled "Molding Process and Apparatus Therefore", and filed on Apr. 14, 1980, now abandoned in the name of R. Angell, Jr., which is incorporated herein by reference. In this application, a process for rapidly fabricating fiber reinforced thermoset resin articles is described. The fiber reinforcement is comprised of one or more fibers with a melting point or a glass transition temperature above about 130° C. The process comprises the steps of (a) providing in a heated matched metal die mold, a bonded web of one or more of said fibers, (b) providing in an accumulator zone a liquid body of a thermosettable organic material having a viscosity determined at 120° C., in the absence of curing agent therefore, of less than about 50 centipoise, and which is curable upon heating to a thermoset resin composition, the viscosity of said liquid body being maintained essentially constant in the accumulator zone by keeping its temperature below that at which curing of said materials is substantial, (c) closing said mold containing said web, (d) injecting at least a portion of said thermosettable organic material under pressure from said accumulator zone into the mold to thereby fill the cavity in said mold, (e) initiating the curing of said materials by subjecting the materials to a temperature by heating the mold which is above the temperature at which the curing of said materials is initiated, and (f) opening said mold and removing the cured thermoset article therefrom. The fiber reinforcement may be from about 15 to about 80 weight percent of the weight of the molded article which is removed from the mold. A major requirement for the process is low resin viscosity to avoid movement of the reinforcing fibers during resin injection.

A major objective of the process of Ser. No. 135,906 is to produce molded articles with high mechanical properties utilizing short mold cycles. The shorter the mold cycle the greater the productivity which can be achieved.

Many types of resins and initiators are described as useful in the process described in said application Ser. No. 135,906. Typical embodiments therein utilize t-butyl perbenzoate as the initiator with mold cycles ranging from about 3 to about 5 minutes. However, it is desirable to shorten the molding cycle in order to achieve greater productivity without sacrificing mechanical properties.

Azo and peroxide initiators useful for curing thermosetting resins are described by, for example, Gallagher et al. in "Organic Peroxides Review," in Plastics Design and Processing, August 1978, pages 60–67, inclusive. In this article a large number of initiators are described as well as criteria, such as ten-hour half life temperature, by which they are differentiated. This reference, however, does not include in its teachings the significance of gas generation in the selection of appropriate initiators for a given process or its effects on the mechanical properties of a molded article.

It has been found that both the ten-hour half life temperature and amount of gas generated by an initiator have significant effects on the mechanical properties of composite parts prepared from thermosetting resins and are thus important criteria in the selection of appropriate initiators.

In studying the effect of initiator type on composite properties, the type of resin and the molding conditions must be specified. Since property levels depend on the choice of resin, comparisons can only be made along composites made with the same resin. Similarly, since molding conditions also affect properties, a standard molding cycle must be used for samples in the comparison. Thus, the effects of initiator types are most readily demonstrated by comparing the relative properties (e.g., flexural strengths) of a series of composites molded with the same resin under the same conditions.

It has been found that composites with higher mechanical properties are produced on short molding cycles, such as by the process of U.S. patent application Ser. No. 135,906, supra, when the initiators in a select class are utilized in effective amounts. These initiators have (a) a ten hour half life temperature of greater than about 50° and less than 105° C. and, (b) generate during decomposition less than 1.0 milliliter of gas per gram of resin as measured at a temperature of 25° C. and a pressure of one atmosphere. When a mixture of initiators is used, the average ten hour half life is greater than about 50° C. and less than 105° C. This finding has been observed with a wide variety of thermosetting resins.

Initiators which have a ten-hour half life temperature of 105° C. or higher cure the resin more slowly than the preferred class of initiators. Consequently formulations molded with short molding cycles with the more thermally stable initiators, i.e., those with a ten-hour half life temperatures of 105° C. or higher, produce molded articles with lower mechanical properties. In many cases, the article is undercured as evidenced by fuming, and a residue is left on the mold surface.

Furthermore, it has also been found that compositions containing initiators which generate excessive amounts of gas on decomposition (i.e. more than about 1 milliliter per gram of resin as measured at a temperature of 25° C. and a pressure of one atmosphere) do not afford fiber reinforced composites with mechanical properties as high as those obtained with the compositions of this invention. This result is obtained even when longer molding cycles are used.

THE INVENTION

The present invention is directed to curable molding compositions used in the rapid production of fiber reinforced thermoset resin articles having improved mechanical properties, which composition comprises:

(a) a thermosettable organic material containing two or more polymerizable carbon-carbon double bonds, (b) an ethylenically unsaturated monomer which forms a liquid homogeneous mixture with and is copolymerizable with (a) and is different from (a), and (c) an effective amount of an initiator or a mixture of initiators characterized by a ten-hour half life temperature, or in the case of a mixture of initiators, an average ten-hour half life temperature, of greater than 50° C.

and less than 105° C., which produces on decomposition less than 1.0 milliliter of gas per gram of resin as measured at a temperature of 25° C. and a pressure of one atmosphere.

Components (a) and (b) together comprise a liquid thermosetting resin which is curable by free radical mechanisms.

Component (a) may be selected from one or more of the following materials:

(1) An unsaturated polyester. These polyesters are typically the condensation products of a diol and an unsaturated dicarboxylic acid or anhydride. The diol is generally selected from ethylene glycol, diethylene glycol, propylene glycol, dipropylene glycol, neopentyl glycol, alkoxylated derivatives of bisphenol-A, 2,2,4-trimethyl-1,3-pentanediol, 2,2-dimethyl-3-hydroxypropyl 2,2-dimethyl-3-hydroxypropionate, and 1,3-butanediol. The unsaturated acids include maleic acid and fumaric acid. Acids without reactive double bonds which may be used in modifying amounts include phthalic acid, isophthalic acid, terephthalic acid, and adipic acid. Anhydrides of the above acids, such as maleic anhydride and phthalic anhydride are often used.

The unsaturated polyesters are generally prepared by heating approximately equimolar amounts of the diol with the carboxylic acid or anhydride at temperatures in excess of about 200° C. for periods of about 4 to about 24 hours. The polyesters typically have number average molecular weights (Mn) in the range of from about 500 to about 5000, and they contain unsaturation distribution along the chain. These polyesters have acid numbers in the range of from about 2 to about 60. (The acid number is the milligrams of potassium hydroxide needed to neutralize one gram of sample). Many of the polyesters have hydroxyl numbers approximately equal to or greater than their acid numbers.

An additional group of polyesters are also contemplated for use herein. These polyesters are prepared by incorporating dicyclopentadiene into the backbone of the polyester. These polyesters are described, for example, in U.S. Pats. Nos. 3,347,806; 3,933,757; 4,029,848; 4,148,765 and 4,224,430.

(2) A half-ester of a hydroxyl-terminated polyester characterized by the following empirical formula:

wherein n has an average value between about 1.5 and 2, m is 2·n, R is the hydroxyl-free residue of a predominantly hydroxyl-terminated polyester having a molecular weight not exceeding about 1500 and obtained by the condensation of a diol with a dicarboxylic acid or anhydride.

These are described in U.S. patent application Ser. No. 135,905 filed in the name of H. C. Gardner on Apr. 14, 1980, now U.S. Pat. No. 4,294,751 and titled "Polyester Resin Compositions".

The predominantly hydroxyl-terminated polyester used to produce the half ester is typically prepared from (a) a diol selected from the class consisting of 1,2-propylene glycol, 1,3-butanediol, 2,2-dimethyl-1,3-propanediol, dipropylene glycol, diethylene glycol, 2,2-dimethyl-3-hydroxypropyl 2,2-dimethyl-3-hydroxypropionate, and mixtures thereof, and mixtures of ethylene glycol and the aforementioned diols, and (b) a dicarboxylic acid or anhydride selected from the class consisting of maleic acid and anhydride, fumaric acid, orthophthalic acid and anhydride, isophthalic acid, terephthalic acid, bicyclo [2.2.1] hept-5-ene-2,3-dicarboxylic acid and bicyclo [2.2.1]hept-5-ene-2, 3-dicarboxylic acid anhydride, and mixtures thereof. The diol and dicarboxylic acid or anhydride are heated until a polyester is formed possessing an acid number of less than about 15, preferably less than about 10 and most preferably, less than about 5. When the molar ratio of diols to dicarboxylic acids is greater than about 1.5, the hydroxyl number is typically in excess of about 65, and most desirably in excess of 100. Hydroxyl numbers for the hydroxyl terminated polyester can be as high as 250 and greater. Polyester esterification catalysts such as amines or tin compounds may optionally be used to increase the rate of formation of the polyester.

The half ester of formula (I) is conveniently prepared by reacting the predominantly hydroxyl-terminated polyester oligomer with maleic anhydride in a stoichiometric ratio of one mole of hydroxyl per 0.75 to 1.2 moles of maleic anhydride. A catalyst may optionally be used to carry out this reaction. These catalysts include tin compounds and amine compounds.

(3) A half ester of an organic polyol characterized by the following empirical formula:

wherein a is a number having an average value of about 1.5 to less than about 4, b is equal to the free valence of $R_1$ less the average value of a, $R_1$ is the hydroxyl-free residue of an organic polyol which contained from 2 to 4 inclusive, hydroxyl groups, OH, in formula (II).

The organic polyol which is reacted with the maleic anhydride to form the half ester depicted by empirical formula (II) contains at least two carbon atoms and which may contain from 2 to 4, inclusive, hydroxyl groups. These polyols include alkane diols, triols, tetraols, aliphatic ether containing diols, triols, tetraols, cycloaliphatic containing diols, triols, and tetraols, and aromatic containing diols, triols, and tetraols, and the like. Specific illustrations of organic polyols suitable in the practice of this invention include the following: ethylene glycol, diethylene glycol, 2,2,4-trimethyl-1,3-pentane diol, dipropylene glycol, propylene glycol, polypropylene glycol having an average molecular weight of about 150 to about 600, triethylene glycol, 1,4-cyclohexane dimethanol, neopentyl glycol, 2,2-dimethyl-3-hydroxypropyl 2,2-dimethyl-3-hydroxypropionate, the ethylene and propylene oxide adducts of 2,2-dimethyl-3-hydroxypropyl 2,2-dimethyl-3-hydroxypropionate, triethanolamine, 1,3-butanediol, tetraethylene glycol, 2,2-bis(4-hydroxyphenyl)propane and the ethylene and propylene oxide adducts of 2,2-bis(4-hydroxyphenyl)propane, pentaerythritol, erythritol, glycerine, trimethylolpropane, 1,4-buitanediol, 1,6-hexanediol, the polycaprolactone ester of a polyol in which from about 1 to about 5, preferably from about 1.5 to about 4.0 equivalents of caprolactone are esterified with a polyol (as described in, for example, U.S. Pat. No. 3,169,045) such as trimethylolpropane or diethylene glycol (preferably the polycaprolactone ester of a polyol is the polycaprolactone ester of trimethylolpropane in which about 1.5 equivalents of caprolactone are reacted with trimethylolpropane or the polycaprolactone ester of trimethylolpropane where about 3.6 equivalents of caprolactone are esterified with trimethylolpropane), 2-ethyl-1,3-hexanediol, 1,5-pentanediol, tripropylene glycol, 2,2-bis(4-hydroxycyclohexyl)propane, 1,2,6-hexane triol, 1,3-propane diol, and the like.

The half-esters of formula (II) are described in for example U.S. Pat. No. 4,263,413.

These half esters may also be blended with a polyepoxide or an unsaturated polyester.

(4) A poly(acrylate) characterized by the following empirical formula:

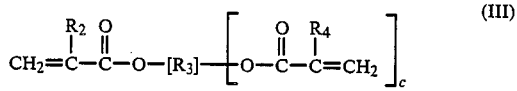

wherein $R_3$ is the hydroxy-free residue of an organic polyhydric alcohol which contained alcoholic hydroxyl groups bonded to different carbon atoms, $R_2$ and $R_4$ are independently hydrogen or methyl, and c is 1 to 3.

The polyhydric alcohol suitable for preparing the poly(acrylate) typically contains at least two carbon atoms and may contain from 2 to 4, inclusive, hydroxyl groups. These polyhydric alcohols include alkane diols, triols, tetraols, aliphatic ether containing diols, triols, tetraols, cycloaliphatic containing diols, triols, and tetraols, and aromatic containing diols, triols, and tetraols, and the like. Specific illustrations of organic polyols suitable in the practice of this invention include the following: ethylene glycol, diethylene glycol, 2,2,4-trimethyl-1,3-pentanediol, dipropylene glycol, propylene glycol, polypropylene glycol having an average molecular weight of about 150 to about 600, triethylene glycol, 1,4-cyclohexane dimethanol, neopentyl glycol, 2,2-dimethyl-3-hydroxypropyl,2-dimethyl-3-hydroxypropionate, polyethylene glycol having an average molecular weight of about 150 to about 600, 2,2-bis[4-(2-hydroxyethoxy)phenyl]propane, 2,2-bis[4-(2-hydroxypropoxy)phenyl]propane, triethanolamine, 1,3-butanediol, tetraethylene glycol, 2,2-bis(4-hydroxyphenyl)propane, glycerine, trimethylolpropane, 1,4-butanediol, the polycaprolactone ester of trimethylolpropane which contains about 1.5 equivalents of caprolactone ester, the polycaprolactone ester of trimethylolpropane which contains about 3.6 equivalents of caprolactone, 2-ethyl-1,3-hexanediol, 1,5-pentanediol, tripropylene glycol, 2,2-bis-(4-hydroxycyclohexyl)propane, 1,2,6-hexane triol, 1,3-propanediol, 1,6-hexanediol and the like. Mixtures of the aforementioned polyols may also be used in this invention.

The poly(acrylate) of the aforementioned organic polyhydric alcohol can be prepared by the reaction of acrylic acid or methacrylic acid or their simple esters with the polyhydric alcohol under conditions well known in the art.

(5) A vinyl ester resin produced by the addition of an unsaturated monocarboxylic acid to a polyepoxide.

The vinyl esters which may be used in this invention are produced from the addition of an unsaturated monocarboxylic acid to a polyepoxide. These vinyl esters are well known in the art and many are commercially available. These are described in, for example, U.S. Pats. Nos. 3,377,406; 3,637,618; 4,197,340 3,317,365, and 3,373,075.

The unsaturated carboxylic acid which may be used includes acrylic acid, methacrylic acid, crotonic acid, and acids prepared from the reaction of hydroxyalkyl acrylates or methacrylates with maleic anhydride, phthalic anhydride, and the like.

The polyepoxides may be saturated or unsaturated, aliphatic, cycloaliphatic, aromatic or heterocyclic and may be substituted, if desired, with non-interfering substituents, such as halogen atoms, hydroxyl groups, ether radicals, and the like.

The epoxides which may be used herein include: glycidyl ethers of novolac resins, i.e., phenol-aldehyde condensates. Preferred resins of this type are those of the formula:

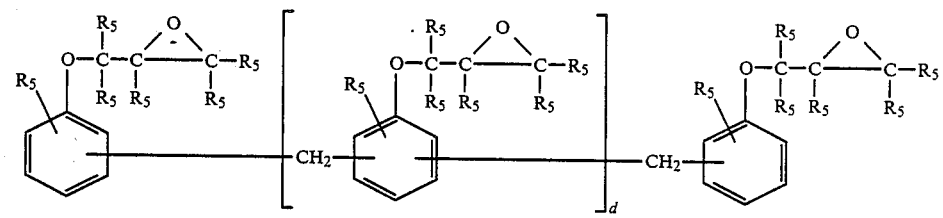

wherein $R_5$ is hydrogen or an alkyl radical and d has a value of from 0.1 to about 5, and preferably less than 1.0. Preparation of these polyepoxides is illustrated in, for example, U.S. Pats. Nos. 2,216,099 and 2,658,885.

Other groups of epoxy-containing compounds suitable for use herein include: the epoxidized esters of the polyethylenically unsaturated monocarboxylic acids, such as epoxidized linseed or soybean oil, methyl linoleate, monoglycerides of tung oil fatty acids, and the like; the epoxidized esters of unsaturated monohydric alcohols and polycarboxylic acids, such as, di(2,3-epoxyoctyl)pimelate; epoxidized esters of unsaturated alcohols and unsaturated carboxylic acids, such as 3,4-epoxycyclohexylmethyl-3,4-epoxycyclohexane carboxylate, and the like; epoxidized derivatives of polyethylenically unsaturated polycarboxylic acids, such as dimethyl 8,9,12,13-diepoxyeicosanedioate; epoxidized polyesters obtained by reacting an unsaturated polyhydric alcohol and/or unsaturated polycarboxylic acid or anhydride, such as the polyester obtained by reacting 8,9,12,13-eicosanedienedioic acid with ethylene glycol, and the like; and epoxidized polyethylenically unsaturated hydrocarbons, such as the epoxidized 2,2-bis(2-cyclohexenyl)-propane and epoxidized dimer of cyclopentadiene, and the like.

A preferred polyepoxide includes the glycidyl polyethers of polyhydric phenols and polyhydric alcohols. Especially preferred are the diglycidyl polyethers of 2,2-bis(4-hydroxyphenyl)propane having the following formula:

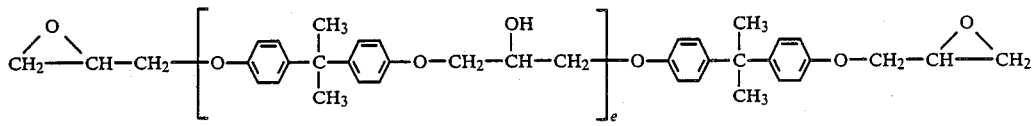

wherein e has values so that the average molecular weight of the saturated polyepoxide is from 340 to about 2000. Acid modified vinyl ester resins may also be included in this invention. These are described, for example, in U.S. Pats. Nos. 3,634,542; 3,548,030 and 3,564,074.

(6) A urethane poly(acrylate) characterized by the following empirical formula:

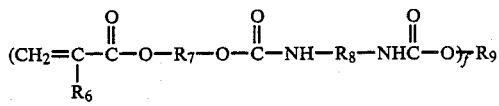

wherein $R_6$ is hydrogen or methyl; $R_7$ is a linear or branched divalent alkylene or oxyalkylene radical having from 2 to about 5 carbon atoms; $R_8$ is a divalent radical remaining after reaction of a substitued or unsubstitued diisocyanate; $R_9$ is the hydroxyl-free residue of an organic polyhydric alcohol which contained hydroxyl groups bonded to different carbon atoms; and f has an average value of from 2 to 4. These compounds are typically the reaction products of a polyol in which the hydroxyl groups are first reacted with a diisocyanate using one equivalent of diisocyanate per hydroxyl group, and the free isocyanate groups are then reacted with a hydroxyalkyl ester of acrylic or methacrylic acid.

The polyhydric alcohol suitable for preparing the urethane poly(acrylate) typically contains at least two carbon atoms and may contains from 2 to 4, inclusive, hydroxyl groups. Such polyols are described in (3) and (4) supra. A preferred polyol is one based on the polycaprolactone ester of a polyhydric alcohol such as described in, for example, U.S. Pat. No. 3,169,945. Unsaturated polyols may also be used.

Diisocyanates suitable for preparing the urethane poly(acrylate)s are well known in the art and include aromatic, aliphatic, and cycloaliphatic diisocyanates. Such diisocyanates may be extended with small amounts of glycols to lower their melting points and provide a liquid diisocyanate.

The hydroxyalkyl esters suitable for final reaction with the polyisocyanate formed from the polyol and diisocyanate are exemplified by hydroxyethyl acrylate, hydroxypropyl acrylate, hydroxyethyl methacrylate, and hydroxypropyl methacrylate. Any acrylate or methacrylate ester or amide containing an isocyanate reactive group may be used herein, however.

Urethane poly(acrylates) such as the above are described in for example, U.S. Pats. Nos. 3,700,643, 4,131,602, 4,213,837, and 3,772,404.

(7) A urethane poly(acrylate) characterized by the following empirical formula:

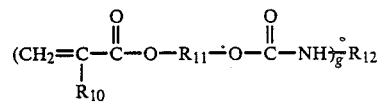

wherein $R_{10}$ is hydrogen or methyl; $R_{11}$ is a linear or branched alkylene or oxyalkylene radical having from 2 to about 5 carbon atoms; $R_{12}$ is the polyvalent residue remaining after reaction of a substituted or unsubstitued polyisocyanate; and g has an average value of from about 2 to about 4. These compounds are typically the reaction products of a polyisocyanate with a hydroxyalkyl ester of acrylic or methacrylic acid using one equivalent of the hydroxyalkyl ester per isocyanate group.

Polyisocyanates suitable for preparing the urethane poly(acrylate) are well known in the art and include aromatic, aliphatic, and cycloaliphatic polyisocyanates. Some diisocyanates may be extended with small amounts of glycol to lower their melting point and provide a liquid diisocyanate.

Urethane poly(acrylates) such as the above are described in, for example, U.S. Pat. No. 3,297,745 and British Pat. No. 1,159,552.

(8) A half-ester or half-amide characterized by the following empirical formula:

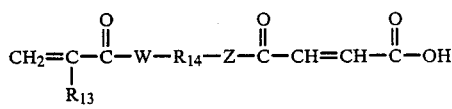

wherein $R_{13}$ is hydrogen or methyl, $R_{14}$ is an aliphatic or aromatic radical contining from 2 to about 20 carbon atoms, optionally containing —O— or

W and Z are independently —O— or

and $R_{15}$ is hydrogen or low alkyl. Such compounds are typically the half-ester or half-amide product formed by the reaction of a hydroxy, amino, or alkylamino containing ester or amide derivatives of acrylic or methacrylic acid with maleic anhydride, maleic acid, or fumaric acid. These are described in, for example, U.S. Pats. Nos. 3,150,118 and 3,367,992.

(9) An unsaturated isocyanurate characterized by the following empirical formula:

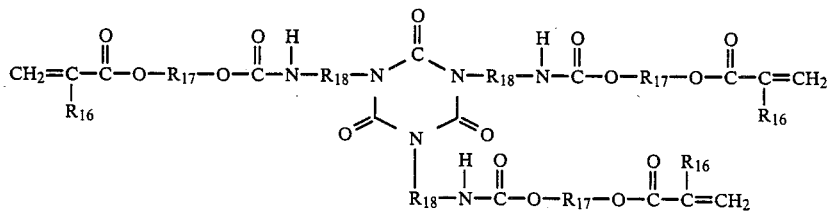

wherein $R_{16}$ is hydrogen or methyl, $R_{17}$ is a linear or branched alkylene or oxyalkylene radical having from 2 to about 5 carbon atoms, and $R_{18}$ is a divalent radical remaining after reaction of a substituted or unsubstituted diisocyanate. Such products are typically produced by the trimerization reaction of a diisocyanate followed by reaction of the remaining free isocyanate groups with a hydroxyalkyl ester of acrylic or methacrylic acid.

It is understood that during the formation of the isocyanurate, a diisocyanate may participate in the formation of two isocyanurate rings thereby forming cross-linked structures in which the isocyanurate rings may be linked by the diisocyanate used. Polyisocyanates might also be used to increase this type of cross-link formation.

Diisocyanates suitable for preparing the isocyanurate are well known in the art and include aromatic, aliphatic, and cycloaliphatic diisocyanates. Such diisocyanates may be extended with small amounts of glycols to lower their melting point and provide a liquid diisocyanate.

The hydroxyalkyl esters suitable for final reaction with the free isocyanurate groups remaining after trimerization of the diisocyanate to an isocyanurate are exemplified by hydroxyethyl acrylate, hydroxypropyl acrylate, hydroxethyl methacrylate, and hydroxpropyl methacrylate. Any acrylate or methacrylate ester or amide containing an isocyanate reactive group may be used herein, however.

Such unsaturated isocyanurates are described in, for example, U.S. Pat. No. 4,195,146.

(10) Poly(amide-esters) as characterized by the following empirical formula:

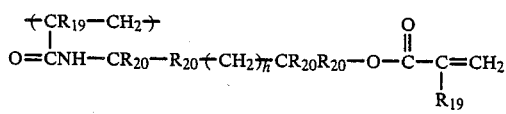

wherein $R_{19}$ is independently hydrogen or methyl, $R_{20}$ is independently hydrogen or lower alkyl, and h is 0 or 1. These compounds are typically the reaction product of a vinyl addition prepolymer having a plurality of pendant oxazoline or 5,6-dihydro-4H-1,3-oxazine groups with acrylic or methacrylic acid. Such poly(amide-esters) are described in, for example, British Pat. No. 1,490,308.

(11) A poly(acrylamide) or poly(acrylate-acrylamide) characterized by the following empirical formula:

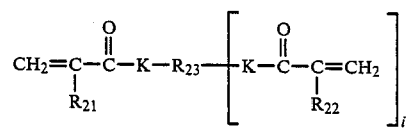

wherein $R_{23}$ is the polyvalent residue of an organic polyhydric amine or polyhydric aminoalcohol which contained primary or secondary amino groups bonded to different carbon atoms or, in the case of an aminoalcohol, amine and alcohol groups bonded to different carbon atoms; $R_{21}$ and $R_{22}$ are independently hydrogen or methyl; K is independently —O— or $$-\underset{\underset{R_{24}}{|}}{N}-;$$

$R_{24}$ is hydrogen or lower alkyl; and i is 1 to 3.

The polyhydric amine suitable for preparing the poly(acrylamide) contains at least 2 carbon atoms and may contain 2 to 4, inclusive, terminal or pendant amine groups. The polyhydric amines include alkane polyamines and aromatic containing polyamines. Also included are amine terminated polyamides and polyamines containing ether, amino, and ester groups in the organic residue.

The polyhydric aminoalcohols suitable for preparing the poly(acrylate-acrylamide) contain at least 2 carbon atoms and may contain 2 to 4, inclusive, amine or alcohol groups, with the proviso that at least one group is a primary or secondary amine. These include alkane aminoalcohols and aromatic containing aminoalcohols. Also included are polyhydric aminoalcohols containing ether, amino, amide, and ester groups in the organic residue.

Examples of the above compounds are described in, for example, Japanese publications J80030502, J80030503, and J80030504 and in U.S. Pat. No. 3,470,079 and British Patent No. 905,186.

It is understood by those skilled in the art that the thermosettable organic materials described, supra, are only representative of those which may be used in the practice of this invention.

Component (b) is an ethylenically unsaturated monomer which forms a liquid homogeneous mixture with and is copolymerzable with (a). It contains at least a single —CH═C< group, and preferably a $CH_2$═C< group and include styrene and its derivatives and homologues, divinylbenzene, diallylphthalate, nonfunctionalized esters of acrylic or methacrylic acid (such as ethyl acrylate, butyl acrylate, and methyl methacrylate) unsaturated nitriles (such as acrylonitrile and methacrylonitrile) and the like. Also, the monomers include vinyl esters, e.g., vinyl acetate, vinyl propionate, and the like. Also, included herein are low levels of maleic anhydride. Mixtures of the aforementioned monomers may be effectively employed in the practice of this invention.

Component (b) in the composition of this invention may also include acrylic or methacrylic acid or a functionalized derivative thereof. The functionalized derivatives are characterized by the presence of acrylate, methacrylate, acrylamide, and methacrylamide groups and also by the presence of functional groups such as hydroxyl, amino, alkylamino, and epoxide, for example. Preferred monomers are characterized by the following formula:

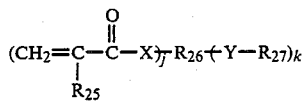

wherein $R_{25}$ is independently hydrogen or methyl; X and Y are independently —O— or

wherein $R_{28}$ *is hydrogen or lower alkyl*; $R_{26}$ is an aliphatic or aromatic radical containing from 2 to about 10 carbon atoms, optionally containing —O— or

$R_{27}$ is hydrogen or an aliphatic or aromatic radical containing 1 to 10 carbon atoms; and j and k are integers of or greater than 1, preferably 1 to 3.

These functionalized derivatives of acrylic or methacrylic acid include 2-hydroxyethyl acrylate, 2-hydroxyethyl methacrylate, hydroxpropyl acrylate, hydroxypropyl methacrylate, hydroxybutyl acrylate, hydroxybutyl methacrylate, 2-aminoethyl acrylate, 2-aminoethyl methacrylate, 2-methylaminoethyl acrylate, 2-methylaminoethyl methacrylate, 2-dimethylaminoethyl acrylate, 2-dimethylaminoethyl methacrylate, 2-hydroxyethyl acrylamide, 2-hydroxyethyl methacrylamide, 2-aminoethyl acrylamide, 2-aminoethyl methacrylamide, diethylene glycol monoacrylate, diethylene glycol monomethacrylate, 2-methoxyethyl acrylate, 2-methoxyethyl methacrylate, pentaerythritol monoacrylate, pentaerythritol monomethacrylate, pentaerythritol diacrylate, pentaerythritol dimethacrylate, pentaerythritol triacrylate, glycerol monoacrylate, glycerol monomethacrylate, trimethylolpropane monoacrylate, trimethylolpropane monomethacrylate, glycidyl methacrylate, glycidyl acrylate, hydroxymethyl acrylamide and the like, or mixtures thereof. It is understood that several isomers of many of these monomers exist and would be suitable for use herein either as individual components or as mixtures with any of the other monomers. Similarly, it is understood that additional derivatives containing aromatic rings and other alkyl groups in the acid or ester portion of the Formula may also be included.

The most preferred ethylenically unsaturated monomers contemplated in the practice of this invention are styrene and mixtures of styrene with hydroxyalkyl esters of acrylic or methacrylic acid.

Component (c) comprises an initiator and mixtures of initiators.

Initiators which are commonly used to initiate curing of such unsaturated resins include diacyl peroxides, perketals, peresters, and azo compounds. All of these initiator classes contain compounds which have ten-hour half life temperatures of greater than about 50° and less than 105° C. However, many of these initiators generate unacceptable amounts of gas during their decomposition. For example, azo compounds generate nitrogen gas in essentially quantitative yields when they decompose. Peresters of alkyl carboxylic acids, such as t-butyl peroctoate, produce high levels of carbon dioxide upon decomposition. Diacyl peroxides and peroxycarbonates derived from aliphatic carboxylic acids also generate high levels of carbon dioxide. Such initiators are not useful in this invention when they comprise the major portion of component (c). However, they may be advantageously used when added in small amounts together with the preferred initiators.

In general, perketals and the peresters of aromatic or α, β-unsaturated carboxylic acids generate low levels of gas when they decompose. Provided that these initiators possess the specified ten-hour half life temperatures, they may be used as component (c) in this invention. When combined with components (a) and (b) they afford compositions which are suitable for the rapid production of fiber reinforced molded articles having a good combination of mechanical properties.

The perketals have the following general formula:

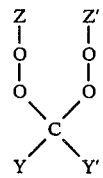

wherein Z and Z' are independently a tertiary alkyl group of from 4 to 12 carbon atoms and Y and Y' are independently various alkyl groups and Y and Y' together with the central carbon atoms may also form cycloalkyls. Y and Y' may also contain halogen, ester, nitrile or keto groups.

Perketals are prepared by reacting alkyl hydroperoxides (ZOOH) with ketones

Examples of such compounds include 1,1-bis(t-butylperoxy)-3,3,5-trimethylcyclohexane, 2,2-bis(t-butylperoxy)butane, 1,1-bis(t-butylperoxy)cyclohexane, and 1,1-bis(t-amylperoxy)cyclohexane. Other examples of suitable perketals are found in, for example, U.S. Pat. Nos. 2,455,569, 3,763,275, 3,928,466 and 3,950,432.

Several of these perketals are commercially available as for example Trigonox 29-B75 (supplied by Noury Chemical Corp., Burt, N.Y.), and Lupersol 231, Lupersol 331-80B and Lupersol 220-M50 (supplied by the Lucidol Division of Pennwalt Corp., Buffalo, N.Y.).

An aryl perester suitable for use in this invention is t-butyl 2-methylperbenzoate (supplied by the Witco Div. of U.S. Peroxygen Corp. as Esperox 497). Another suitable perester is the t-butylperoxy monoester of maleic acid (supplied by Lucidol Division of Pennwalt Corp.). All of the above perketal and perester initiators are supplied with an inert diluent in the formulation.

Mixtures of initiators may be used herein. All mixtures of initiators must satisfy the gas generation criteria defined, supra. Four types of mixtures are suitable for use in this invention. The first type of mixture contains two or more initiators in which each component is a member of the preferred class.

The second type of mixture consists of a major amount of an initiator or mixture of initiators which by itself is in the preferred class and a minor amount of an initiator or mixture of initiators with the preferred ten-hour half life temperature but which by itself would generate an excessive amount of gas. For example, mixtures which contain a perketal, i.e., 1,1-bis(t-butylperoxy)-3,3,5-trimethyl-cyclohexane, in a major amount, and minor amounts of, for example, 2-t-butylazo-2-cyano-4-methylpentane, 2-t-butylazo-2-cyanobutane, t-butyl peroctoate, 2,5-dimethyl-2,5-bis(2-ethylhexanoylperoxy)-hexane, or diisonanoyl peroxide are members of this class. Each of the latter initiators which are utilized in the mixture in minor amounts, if used at a level of 1.5 phr, would generate an excessive amount of gas. The amounts of each initiator may be varied provided that the total amount of gas generated by the initiator mixture per gram of resin is less than 1.0 milliliter as measured at a temperature of 25° C. and a pressure of one atmosphere.

A third type of mixture of initiators comprises (a) an initiator or mixture of initiators which generates a low amount of gas but has a ten-hour half life temperature of 105° C. or greater and (b) a member or members of the preferred class of initiators. The average ten-hour half life temperature of a mixture of initiators is defined as the weighted average of the ten-hour half life temperatures of the individual initiators. This average ten-hour half life temperature must be less than 105° C. Examples of this class include mixtures of t-butyl perbenzoate with 1,1-bis(t-butylperoxy)-3,3,5-trimethylcyclohexane, and mixtures of t-butyl perbenzoate with 1,1-bis(t-butylperoxy)cyclohexane.

A fourth type of initiator mixture which may be used in this invention comprises (a) a major amount of an initiator or mixture of initiators which generates a low amount of gas but has a ten-hour half life temperature of 105° C. or greater and (b) a minor amount of an initiator or mixture of initiators with lower thermal stability which if used by itself at a level of 1.5 phr would generate an excessive amount of gas. These mixtures include a major amount of, for example, t-butyl perbenzoate and a minor amount of, for example, 2-t-butylazo-2-cyano-4-methylpentane, 2-t-butylazo-2-cyanobutane, t-butyl peroctoate, 2,5-dimethyl-2,5-bis-(2-ethylhexanoylperoxy)hexane or diisonanoyl peroxide. The average ten-hour half life temperatures as defined, supra, must also be less than 105° C. for this mixture.

The compositions of this invention contain component (a) present in amounts of from about 10 to about 75, preferably from about 25 to about 60 weight percent and component (b) present in amounts of from about 5 to about 75, preferably from about 10 to about 60 weight percent.

Component (c) is present in amounts of from about 0.4 to about 3.0 parts per 100 parts of resin (phr) since this amount of initiator provides the fastest cure without adversely affecting the mechanical properties of the molded article. Preferably, from about 1.0 to about 1.5 phr of initiator is used.

The compositions of this invention are typically prepared by solution blending the thermosettable organic material, the ethylenically unsaturated monomer, the initiator and any other optional ingredients at temperates of from about 25° C. to about 120° C.

In the preferred embodiment the compositions of this invention are used to make molded articles containing fibrous reinforcement.

The fibers useable in this invention have a melting point of a glass transition temperature above about 130° C. They include fiberglass, carbon fibers, aromatic polyamide fibers (such as aramid fibers sold by E. I. duPont de Nemours and Company, Wilmington, Del., under the trademark of KEVLAR), metal fibers such as aluminum and steel fibers, boron fibers, and the like.

The carbon fibers include those having a high Young's modulus of elasticity and high tensile strength. These carbon fibers may be produced from pitch, as described in U.S. Pats. Nos. 3,976,729; 4,005,183 and 4,026,788, for example.

The preferred fibers are fiberglass, carbon fibers, aromatic polyamide fibers, and mixtures thereof.

The fibers which are suitable for use in this invention, preferably have a length of at least ¼ inch, and an average length of at least ½ inch. Fibers with different lengths exceeding ¼ inch may be used, provided that at least about 50 percent of the fibers have lengths greater than ½ inch. Preferred fiber lengths are from 1 to 2 or more inches. Continuous filaments may also be used.

It is also within the scope of this invention to include the use of fiber reinforcements of shorter lengths and also fillers such as milled glass and calcium carbonate.

The molded article produced from the compositions of this invention contains from about 10 to about 80, preferably from about 40 to about 70 weight percent of the reinforced fiber, and may also contain from about 3 to about 40 weight percent of particulate filler.

It is furthermore desirable to utilize a vinyl polymerization inhibitor in those cases where the resin solution is to be stored and/or shipped. Suitable vinyl polymerization inhibitors are hydroquinone, para-benzoquinone, t-butyl catechol, quinhydrone, toluhydroquinone, mono-t-butyl hydroquinone, 2,5-di-t-butylhydroquinone, hydroquinone monomethyl ester, the biphenol derivatives described in U.S. Pat. No. 4,158,027, and the like. The amount of inhibitor for the purpose of preventing vinyl polymerization can be that conventionally used, namely from about 100 to about 1000 ppm of the combined weight of components (a), (b) and (c).

These compositions of this invention may be used in a variety of fabrication techniques, such as pultrusion.

As previously described, the preferred procedure for producing a molded article from the compositions of this invention is described in U.S. patent application Ser. No. 135,906, supra.

In said U.S. patent application Ser. No. 135,906 the apparatus comprises: (a) a heatable matched metal die mold containing one or more cavities therein with means for opening said mold to expose such cavities, and closing the same, and means for controlling the injection of a thermosettable organic liquid to such cavities when the mold is closed, (b) means associated with said mold, whereby one or more fibers in the form of an interlocked mass are provided in a portion of the cavities thereof when the mold is open to expose such cavities and prior to the injection of the thermosettable organic liquid to such cavities when the mold is closed, (c) accumulator means associated with said mold which can contain a thermosettable liquid transportable to means for controlling injection of said liquid to such cavities, and (d) cooling means associated with the means for controlling the injection of such liquid to such cavities, whereby the temperature of the liquid in such injection means is maintained substantially below the temperature of the mold.

EXAMPLES

The following Examples serve to illustrate specific embodiments of this invention and it is not intended that the invention shall be limited by the examples.

In the Examples the flexural strength and modulus of the prepared composites were measured according to the procedure described in ASTM D-790. Five separate flexural bars were tested from each plaque and the valves listed are the average of those tests. The weight percent of glass was determined by ashing.

The apparatus used was similar to that described in U.S. patent application Ser. No. 135,906 described, supra.

In the Examples, five different resins were used. All of the resins contained 0.5 phr of Zelec UN mold release (an organophosphate mold release supplied by E. I. duPont de Nemours, Wilmington, Del.).

Four resins were made with commercially available materials:

Poly(acrylate) Resin A: A solution containing 50 weight percent ethoxylated bisphenol A dimethacrylate and 50 weight percent of styrene. The ethoxylated bisphenol A dimethacrylate is available as SR-348 from Sartomer Company.

Poly(acrylate) Resin B: A solution containing 50 weight percent of ethoxylated bisphenol A dimethacrylate, 28 weight percent of styrene, and 22 weight percent of 2-hydroxyethyl acrylate. The ethoxylated bisphenol A dimethacrylate is commercially available as SR-348 from Sartomer Company.

Vinyl Ester Resin: A vinyl resin containing the reaction product of methacrylic acid with a mixture of diglycidyl polyethers of bisphenol A using approximately one mole of methacrylic acid per mole of epoxide groups. The number average molecular weight (Mn) of the reaction product was approximately 900 to 1000. The vinyl ester resin is commercially available as a 50 percent styrene solution as Derakane 411-C50 (available from Dow Chemical Co.).

Polyester resin - A solution containing styrene and an unsaturated polyester prepared from maleic anhydride, isophthalic acid, propylene glycol and diethylene glycol. The polyester had an acid number of about 25, and a number average molecular weight (Mn) of about 2400. This polyester is commercially available as a 70/30 polyester/styrene solution as USS 14017 polyester resin (available from U.S. Steel Corp.). It was diluted with styrene to form a 50/50 polyester/styrene solution.

The fifth resin was prepared as described below:

Maleate Half Ester Resin:

A 10 gallon stainless steel reactor equipped with an agitator and inert gas inlet and outlet was charged with 21.94 kg. of maleic anhydride. When the liquid anhydride was at 63° C., 9.98 kg of molten 2,2,4-trimethyl-1,3-pentanediol and 3.32 kg of propylene glycol were added, causing the temperature of the mixture to drop to 48° C. The mixture was then warmed to 55° C. and 17 g of N-methylimidazole was added with agitation. The mixture was warmed to 80° C. during the next 50 minutes. It was then cooled to 61° C. and treated with an additional 53 g of N-methylimidazole. The reaction mixture was warmed to 80° C., maintained at that temperature for 3 hours and then discharged. The product was a viscous amber syrup which contained less than 15 percent of the original charge of maleic anhydride in unreacted form.

A 1000 g portion of the product was blended with 1000 g of styrene containing 0.50 g of methyl hydroquinone. The resulting amber solution had an acid number of 174 when measured in a pyridine/methanol mixed solvent.

COMPOSITIONS OF INITIATORS

In the Examples and Controls which follow several initiators are referred to by their commercial names. These initiators are listed in Table I along with their active components. Both Trigonox 29-B75 and Lupersol 331-80B are formulated with an inert liquid carrier. All of the remaining initiators in the Examples had purities of 95 percent or higher.

TABLE I

| COMPOSITIONS OF INITIATORS | | |
|---|---|---|
| Initiator | Active Component | Assay (Wt %) |
| Trigonox[a] 29-B75 | 1,1-bis(t-butylperoxy)-3,3,5-trimethyl-cyclohexane | 75 |
| Lupersol 331-80B[b] | 1,1-bis(t-butylperoxy)-cyclohexane | 80 |
| Luazo 96[b] | 1-t-butylazo-1-cyano-cyclohexane | 95 |
| Luazo 70[b] | 2-t-butylazo-2-cyano-4-methylpentane | 95 |

[a]Noury Chemical Corp., Burt, N.Y.
[b]Lucidol Division of Pennwalt Corp., Buffalo, N.Y.

Determination of the Amount of Gas Generated by the Initiator

The amount of gas liberated by the decomposition of a free radical initiator was determined by two methods. In these experiments, styrene monomer was used as a model for the thermosetting resin. In the first method, a sample of styrene containing the initiator was placed in a stainless steel vessel having a port sealed by a rubber septum which allowed sampling via a hypodermic syringe needle. The pipe was heated at 150° to 160° C. for a period sufficient to decompose more than 97 percent of the initiator. At the end of this period, the vessel was cooled to room temperature, and a sample of gas above the polystyrene was removed for analysis by gas chromatography. The yield of carbon dioxide was reported in ml of gas at 25° C. and atmospheric pressure per gram of styrene.

The second method involved heating a 25×200 mm test tube containing a styrene/initiator solution as described above. In these experiments gas volume was measured directly since the tube was connected to a gas buret. The yield of gas was measured at room temperature.

EXAMPLE 1

Gas Generation from Trigonox 29-B75 measured by Gas Chromatography (GC method).

A 4×¼ inch stainless steel pipe capped on one end was charged with 3.0 g of styrene and 0.003 g of Trigonox 29-B75. The pipe was sealed with an adapter with a rubber septum through which a hypodermic syringe needle could be passed. An internal standard (2 ml of ethane) was added to the sealed pipe by a syringe. The pipe was then heated in an oil bath at 160° C. for 20 minutes. (The half life of the initiator at this temperature was about 30 seconds). After the pipe was removed from the bath and cooled to room temperature (about 25° C.), the gas phase above the polystyrene was analyzed by gas chromatography. The yield of carbon dioxide was 0.6 ml, or about 0.2 ml per gram of styrene, based on 1 part by weight of initiator per 100 parts of styrene.

EXAMPLE 2

Gas Generation from Trigonox 29-B75 measured using a Gas Buret (Buret method).

A 25×200 mm test tube was charged with 15 g of styrene and 0.225 g of Trigonox 29-B75. The tube was sealed with a rubber serum cap, connected to a gas buret, and then heated at 150° C. in an oil bath for 20 minutes. (At 150° C., the half life of this initiator is approximately 1.2 minutes). At the end of this period, the test tube was removed from the bath and cooled to room temperature (about 25° C.). The amount of gas produced was determined to be 7.4 ml using the gas buret. Therefore, with 1.5 parts of Trigonox 29-B75 per 100 parts of styrene, the yield of gas was 0.5 ml per gram of styrene.

EXAMPLES 3-7

The procedures described in Examples 1 and 2 were used to determine the amount of gas liberated from initiators and initiator mixtures which are within the scope of this invention. Table II lists the ten-hour half life temperatures of the initiators as well as the amount of gas produced during decompostion in styrene monomer. The results are normalized to a constant initiator concentration (1.5 parts by weight per 100 parts by weight of styrene) to allow for comparison between initiators.

Controls A-G

The procedures described in Examples 1 and 2 were used to determine the amount of gas liberated from typical initiators and initiator mixtures which are outside the scope of this invention. Table III summarizes these results. Control A through E describe initiators which when used at the 1.5 phr level generate more gas than is contemplated in the practice of this invention. Controls F and G describe an initiator which produces only a small amount of gas, but has a ten-hour half life temperature in excess of that specified in this invention.

TABLE III

| | INITIATOR | | | | Gas Evolution[a] | | |
|---|---|---|---|---|---|---|---|
| Control | Type | Amount (phr[c]) | Amount of Active Component (phr[c]) | 10 Hr. Half Life Temperature in Non Polar Solvent (°C.) | Method | Amount (ml/g) | Normalized Gas Evolution[b] (ml/g) |
| A | t-butyl peroctoate | 1.0 | 1.0 | 73 | GC | 1.1 | 1.7 |
| B | t-butyl peroctoate | 1.5 | 1.5 | 73 | Buret | 1.5 | 1.5 |
| C | Luazo 70 | 1.5 | 1.5 | 70 | Buret | 1.7 | 1.7 |
| D | Luazo 96 | 1.5 | 1.5 | 96 | Buret | 1.9 | 1.9 |
| E | t-butyl perbenzoate | 0.4 | 0.4 | 105 | | | |
| | t-butyl peroctoate | 1.1 | 1.1 | 73 | Buret | 1.4 | 1.4 |
| F | t-butyl perbenzoate | 1.0 | 1.0 | 105 | GC | 0.23 | 0.4 |
| G | t-butyl perbenzoate | 1.5 | 1.5 | 105 | Buret | 0.6 | 0.6 |

[a]At 25° C. and atmospheric pressure
[b]Calculated for an initiator concentration of 1.5 phr.
[c]Parts by weight per 100 parts of resin (styrene).

The data in Tables II and III illustrates two types of initiator blends which are within the scope of this invention. The first is a mixture of an initiator which is itself suitable for use in this invention with a minor amount of an initiator with lower thermal stability, which by itself would be unsuitable (due to the large amount of gas generated during decomposition). Examples 3 and 4 are representative of this type.

The second type of blend comprises two initiators which individually are unsuitable. Thus, Example 5 depicts a combination of t-butyl perbenzoate (which is too thermally stable) and a minor amount of t-butyl peroctoate (which by itself produces too much gas).

The data in the Tables also indicates that the amount of gas produced by a mixture of initiators is roughly proportional to the types and amounts of initiators in the blend. Thus, much more gas was produced by the t-butyl perbenzoate/t-butyl peroctoate in Control E than by the t-butyl perbenzoate/t-butyl peroctoate mixture in Example 5.

TABLE II

| | INITIATOR | | | | Gas Evaluation[a] | | |
|---|---|---|---|---|---|---|---|
| Control | Type | Amount (phr[c]) | Amount of Active Component (phr[c]) | 10 Hr. Half Life Temperature in Non Polar Solvent (°C.) | Method | Amount (ml/g) | Normalized Gas Evolution[b] (ml/g) |
| 1 | Trigonox 29-B75 | 1.0 | 0.75 | 92 | GC | 0.2 | 0.3 |
| 2 | Trigonox 29-B75 | 1.5 | 1.12 | 92 | Buret | 0.5 | 0.5 |
| 3 | Trigonox 29-B75 | 1.3 | 0.98 | 92 | Buret | 0.6 | 0.6 |
| | Luazo 70 | 0.2 | 0.2 | 70 | | | |
| 4 | Trigonox 29-B75 | 1.6 | 1.2 | 92 | Buret | 1.0 | |
| | Luazo 70 | 0.4 | 0.4 | 70 | | | |
| 5 | t-butyl perbenzoate | 1.1 | 1.1 | 105 | Buret | 0.7 | 0.7 |
| | t-butyl peroctoate | 0.4 | 0.4 | 73 | | | |
| 6 | Lupersol 331-80B | 1.0 | 0.8 | 93 | GC | 0.4 | 0.6 |
| 7 | Lupersol 331-80B | 1.5 | 1.2 | 93 | Buret | 0.8 | 0.8 |

[a]At 25° C. and atmospheric pressure.
[b]Calculated for an initiator concentration of 1.5 phr.
[c]Parts by weight per 100 parts of resin (styrene).

The following Examples and Controls demonstrate the effect of various initiators on the mechanical properties of glass-reinforced composites prepared from several resins. The compositions in the Examples contained initiators from the preferred classes as described above. The compositions in the Controls contained initiators which do not meet the criteria for preferred initiators as defined above.

Examples 8 to 12 and Controls H and I use Poly(acrylate) Resin A.

EXAMPLE 8

Approximately 200 grams (approximately ten 10×5½ inch sheets) of Type AKM glass mat (PPG Industries, Inc. Pittsburgh, Penn.) was placed in a 10×5½×3/16 inch constant volume mold preheated to 140° C. The mold was closed, evacuated for about 5 seconds, and Poly(acrylate) resin A containing 1.5 phr of Trigonox 29-B75 was injected into the mold at a pressure of 300 psi. The pressure was maintained for a dwell period of 10 seconds. After 89 seconds, the cured glass reinforced composite was removed from the mold. The composite contained 67 weight percent glass as determined by ashing.

The composite was tested for flexural strength and modulus.

The results are shown in Table IV.

EXAMPLE 9

The procedure of Example 8 was repeated except that the resin contained 1.3 phr of Trigonox 29-B75 and 0.2 phr of Luazo 70.

The cured composite was removed from the mold after 94 seconds and tested as described in Example 8.

The results are shown in Table IV.

EXAMPLE 10

The procedure of Example 8 was repeated except that the resin contained 1.5 phr of Lupersol 331-80B.

The cured composite was removed from the mold after 93 seconds and tested as described in Example 8.

The results are shown in Table IV.

EXAMPLE 11

The procedure of Example 8 was repeated except that the resin contained 1.1 phr of t-butyl perbenzoate and 0.4 phr of t-butyl peroctoate.

The cured composite was removed from the mold after 94 seconds and tested as described in Example 8.

The results are shown in Table IV.

Control H

The procedure of Example 8 was repeated except that the resin contained 1.5 phr of t-butyl peroctoate.

The cured composite was removed from the mold after 94 seconds and tested as described in Example 8.

The results are shown in Table IV.

The composites in Examples 12 and Control I were prepared using a 10×5½×1/10 inch mold cavity and approximately 110 g of AKM glass mat.

EXAMPLE 12

The procedure of Example 8 was repeated except that the resin contained 1.1 phr of t-butyl perbenzoate and 0.4 phr of t-butyl peroctoate.

The cured composite was removed from the mold after 148 seconds and tested as described in Example 8.

The results are shown in Table IV.

Control I

The procedure of Example 8 was repeated except that the resin contained 0.4 phr of t-butyl perbenzoate and 1.1 phr of t-butyl peroctoate.

The cured composite was removed from the mold after 137 seconds and tested as described in Example 8.

The results are shown in Table IV.

The mechanical properties of composites molded in Examples 8 to 11 and Control H were obtained on test specimens which had a nominal thickness of 3/16 inch. It is clear that the composites made with compositions containing the initiators in the preferred class had flexural strengths and moduli which were significantly higher than those of the composite of Control H. Similarily in thinner plaques, such as in Example 12 and Control I, higher mechanical properties are obtained with initiator mixtures of the preferred class.

TABLE IV

| Example | Initiator Type[a] | phr | Molding time (sec.) | wt. % Glass | Flexural Strength (psi) | Flexural Modulus ($10^6$ psi) |
|---|---|---|---|---|---|---|
| 8 | Trigonox | 1.5 | 89 | 67 | 21,800 | 1.72 |
| 9 | Trigonox | 1.3 | 94 | 67 | 19,200 | 1.55 |
|   | Luazo 70 | 0.2 |   |   |   |   |
| 10 | Lupersol 331-80B | 1.5 | 93 | 67 | 22,600 | 1.72 |
| 11 | TBPB | 1.1 | 94 | 66 | 23,200 | 1.83 |
|   | TBPO | 0.4 |   |   |   |   |
| Control H | TBPO | 1.5 | 94 | 68 | 12,500 | 1.08 |
| 12 | TBPB | 1.1 | 148 | 63 | 32,700 | 1.73 |
|   | TBPO | 0.4 |   |   |   |   |
| Control I | TBPB | 0.4 | 137 | 64 | 27,600 | 1.61 |
|   | TBPO | 1.1 |   |   |   |   |

[a]Trigonox = Trigonox 29-B75
TBPB = t-butyl perbenzoate
TBPO = t-butyl peroctoate Examples 13 and 14 and Controls J and K use Poly(acrylate) Resin B.

EXAMPLE 13

The procedure of Example 8 was repeated except that Poly(acrylate) Resin B was used and contained 1.5 phr of Trigonox 29-B75.

The cured composite was removed from the mold after 66 seconds and tested as described in Example 8.

The results are shown in Table V.

EXAMPLE 14

The procedure of Example 13 was repeated except that the resin contained 1.3 phr of Trigonox 29-B75 and 0.2 phr of Luazo 70.

The cured composite was removed from the mold after 75 seconds and tested as described in Example 8.

The results are shown in Table V.

Control J

The procedure of Example 13 was repeated except that the resin contained 1.5 phr of t-butyl perbenzoate.

The cured composite was removed from the mold after 74 seconds and tested as described in Example 8.

The results are shown in Table V.

Control K

The procedure of Example 13 was repeated except that the resin contained 1.5 phr of t-butyl peroctoate.

The cured composite was removed from the mold after 74 seconds and tested as described in Example 8.

The results are shown in Table V.

The results indicate that composites with higher flexural strengths and moduli are obtained with compositions containing the initiators in the preferred class. Lower properties are obtained in Control J which contains an initiator with a half life temperature in excess of that of the preferred class. Similarily lower properties are obtained in Control K since the initiator in this composition generated an excessive amount of gas.

EXAMPLE 16

The procedure of Example 15 was repeated except that the resin contained 1.3 phr of Trigonox 29-B75 and 0.2 phr of Luazo 70.

The cured composite was removed from the mold after 104 seconds and tested as described in Example 8.

The results are shown in Table VI.

EXAMPLE 17

The procedure of Example 15 was repeated except that the resin contained 1.1 phr of t-butyl perbenzoate and 0.4 phr of t-butyl peroctoate.

The cured composite was removed from the mold after 103 seconds and tested as described in Example 8.

The results are shown in Table VI.

Control L

The procedure of Example 15 was repeated except that the resin contained 1.5 phr t-butyl peroctoate.

The cured composite was removed from the mold after 103 seconds and tested as described in Example 8.

The results are shown in Table VI.

Control M

The procedure of Example 15 was repeated except that the resin contained 1.5 phr of Luazo 96.

The cured composite was removed from the mold after 180 seconds and tested as described in Example 8.

TABLE V

| | Initiator | | Molding time | Properties of the Composite | | |
| Example | Type[a] | phr | (sec.) | wt. % Glass | Flexural Strength (psi) | Flexural Modulus ($10^6$ psi) |
|---|---|---|---|---|---|---|
| 13 | Trigonox | 1.5 | 66 | 66 | 35,900 | 2.09 |
| 14 | Trigonox | 1.3 | 75 | 66 | 39,200 | 2.16 |
| | Luazo 70 | 0.2 | | | | |
| Control J | TBPB | 1.5 | 74 | 67 | 20,100 | 1.09 |
| Control K | TBPO | 1.5 | 74 | 65 | 29,000 | 1.95 |

[a]Trigonox = Trigonox 29-B75
TBPB = t-butyl perbenzoate
TBPO = t-butyl peroctoate Examples 15 to 17 and Controls L and M use Vinyl Ester resin.

EXAMPLE 15

The procedure of Example 8 was repeated except that Vinyl Ester Resin was used and contained 1.5 phr of Trigonox 29-B75.

The cured composite was removed from the mold after 103 seconds and tested as described in Example 8.

The results are shown in Table VI.

The results are shown in Table VI.

The results show that superior mechanical properties are obtained in Vinyl Ester resin composites when the initiators of this invention are used.

TABLE VI

| | Initiator | | Molding time | Properties of the Composite | | |
| Example | Type[a] | phr | (sec.) | wt. % Glass | Flexural Strength (psi) | Flexural Modulus ($10^6$ psi) |
|---|---|---|---|---|---|---|
| 15 | Trigonox | 1.5 | 103 | 66 | 33,900 | 2.01 |
| 16 | Trigonox | 1.3 | 104 | 65 | 33,900 | 2.03 |
| | Luazo 70 | 0.2 | | | | |
| 17 | TPBP | 1.1 | 103 | 67 | 34,900 | 2.09 |
| | TBPO | 0.4 | | | | |
| Control L | TBPO | 1.5 | 103 | 63 | 28,400 | 1.99 |
| Control M | Luazo 96 | 1.5 | 180 | 58 | 15,300 | 0.93 |

[a]Trigonox = Trigonox 29-B75
TBPB = t-butyl perbenzoate
TPBO = t-butyl peroctoate Examples 18 to 21 and Controls N and O were run using Polyester resin.

EXAMPLE 18

The procedure of Example 8 was repeated except that Polyester resin was used and contained 1.5 phr of Trigonox 29-B75.

The cured composite was removed from the mold after 65 seconds and tested as described in Example 8.

The results are shown in Table VII.

EXAMPLE 19

The procedure of Example 8 was repeated except that the resin contained 1.3 phr of Trigonox 29-B75 and 0.2 phr of Luazo 70.

The cured composite was removed from the mold after 66 seconds and tested as described in Example 8.

The results are shown in Table VII.

EXAMPLE 20

The procedure of Example 8 was repeated except that the resin contained 1.5 phr of Lupersol 331-80B.

The cured composite was removed from the mold after 65 seconds and tested as described in Example 8.

The results are shown in Table VII.

EXAMPLE 21

The procedure of Example 8 was repeated except that the resin contained 1.1 phr of t-butyl perbenzoate and 0.4 phr of t-butyl peroctoate.

The cured composite was removed from the mold after 66 seconds and tested as described in Example 8.

The results are shown in Table VII.

Control N

The procedure of Example 18 was repeated except that the resin contained 1.5 phr of t-butyl perbenzoate.

The cured composite was removed from the mold after 66 seconds and tested as described in Example 8.

The results are shown in Table VII.

Control O

The procedure of Example 18 was repeated except that the resin contained 1.5 phr of t-butyl peroctoate.

The cured composite was removed from the mold after 67 seconds and tested as described in Example 8.

The results are shown in Table VII.

The results show the higher property levels are obtained in the Polyester resin composites with the initiators in the preferred class.

mold cavity. After a thermocouple was placed between the fifth and sixth plies, the press was closed. As the temperature in the cavity increased, 2.0 g of Trigonox 29-B75 was added to a solution of 150 g of the Maleate Half Ester resin. When the temperature in the cavity reached 130° C., the resin mixture was injected into the web of fibers over a 5 second period. A hydrostatic pressure of 250 psi was maintained on the resin for 85 seconds, and then the pressure was released. The part was maintained in the mold for an additional 30 seconds. Then the press was opened, and a hot rigid part was removed. The part weighed 165 g.

The part was tested to determine its mechanical properties. The flexural strength, flexural modulus, and glass content are given in Table VIII.

EXAMPLE 23

The procedure described in Example 22 was repeated except that 0.5 phr of Lupersol 331-80B and 1 phr of t-butyl perbenzoate was used in place of Trigonox 29-B75.

The properties of this part are given in Table VIII.

Control P

The procedure in Example 22 was repeated except that 1 phr of t-butyl peroctoate was used as the initiator and the mold temperature was 130° C. With this initiator, a cured part was produced in 2 minutes. The properties of this composite was listed in Table VIII. The flexural strength and flexural modulus of this sample were significantly lower than those of the composites in Examples 22 and 23.

Control Q

The procedure described in Example 22 was repeated using 1.5 phr of t-butyl perbenzoate as the initiator. When the press was opened after 2 minutes, an incompletely cured part was obtained. Many more fumes were evolved from the hot part than were observed with the composites in Examples 22 and 23. In addition, a residue of incompletely cured resin was left on the mold.

The results in Table VIII indicate that Maleate Half

TABLE VII

| | Initiator | | Molding time | Properties of the Composite | | |
| Example | Type[a] | phr | (sec.) | wt. % Glass | Flexural Strength (psi) | Flexural Modulus ($10^6$ psi) |
| --- | --- | --- | --- | --- | --- | --- |
| 18 | Trigonox | 1.5 | 65 | 65 | 15,500 | 1.35 |
| 19 | Trigonox | 1.3 | 66 | 64 | 16,400 | 1.32 |
| | Luazo 70 | 0.2 | | | | |
| 20 | Lupersol 331-80B | 1.5 | 65 | 65 | 15,900 | 1.40 |
| 21 | TBPB | 1.1 | 66° | 65 | 16,600 | 1.35 |
| | TBPO | 0.4 | | | | |
| Control N | TBPB | 1.5 | 66 | 65 | 11,400 | 0.74 |
| Control O | TBPO | 1.5 | 67 | 67 | 12,600 | 1.08 |

[a]Trigonox = Trigonox 29-B75
TBPB = t-butyl perbenzoate
TPBO = t-butyl peroctoate Examples 22 and 23; and Controls P and Q use the Maleate Half Ester Resin.

A series of 6×6×3/16 inch composites were molded on a press similar to that described above. All composites were molded with a two minute mold closed time. The mold temperature was 140° C., except as noted.

EXAMPLE 22

Ten plies of AKM glass mat with dimensions of $5\frac{7}{8}$ inches by $5\frac{7}{8}$ inches and weighing 93 g was placed in the Ester composites with higher mechanical properties are obtained with composites containing the preferred class of initiators. In Control P the initiator produced an excessive amount of gas on decomposition, resulting in lower composite properties. In Control Q the part was not adequately cured in two minutes, since an initiator with a ten-hour half life temperature in excess of that of the preferred class was used.

TABLE VIII

| Example | Initiator Type[a] | phr | Molding time (sec.) | wt. % Glass | Flexural Strength (psi) | Flexural Modulus ($10^6$ psi) |
| --- | --- | --- | --- | --- | --- | --- |
| 22 | Trigonox | 1.33 | 120 | 54 | 35,300 | 1.69 |
| 23 | Lupersol 331-80B | 0.5 | 120 | 52 | 33,600 | 1.89 |
|  | TBPB | 1.0 |  |  |  |  |
| Control P | TBPO | 1.0 | 120 | 51 | 26,300 | 1.40 |
| Control Q | TBPB | 1.5 | 120 | 53 | b | b |

[a]Trigonox = Trigonox 29-B75
TBPB = t-butyl perbenzoate
TBPO = t-butyl peroctoate
[b]Sample was undercured and not tested

What is claimed is:

1. An improved process for preparing fiber reinforced articles which comprises the steps of (a) providing in a heated matched metal die mold a bonded web of one or more fibers with a melting point or glass transistion temperature above 130° C., (b) providing in an accumulator zone a liquid body of a thermosettable organic material having a viscosity determined at 120° C., in the absence of curing agent, of less than about 50 centipoise, and which is curable upon heating to a thermoset resin composition, the viscosity of said liquid body being maintained essentially constant in the accumulator zone by keeping its temperature below that at which curing of said material is substantial, (c) closing said mold containing said web, (d) injecting at least a portion of said thermosettable organic material under pressure from said accumulator zone into the mold to thereby fill the cavity in said mold, (e) initiating the curing of said materials by subjecting the materials to a temperature by heating the mold, which is above the temperature at which the curing of said materials is initiated, and (f) opening said mold and removing the cured thermoset article therefrom, wherein the improvement comprises using a thermosettable organic material comprising (a) a thermosettable organic material containing two or more polymerizable carbon-carbon double bonds, (b) an ethylenically unsaturated monomer which forms a liquid homogeneous mixture with and it copolymerizable with (a) and is different from (a), and (c) an effective amount of an initiator or a mixture of initiators characterized by ten-hour half life temperature, or in the case of a mixture of initiators, an average ten hour half life temperature, of greater than about 50° C. and less than 105° C., which produces on decomposition less than 1.0 milliliter of gas per gram of resin as measured at a temperature of 25° C. and a pressure of one atmosphere.

* * * * *